United States Patent [19]
Hornbeck

[11] Patent Number: 5,142,405
[45] Date of Patent: Aug. 25, 1992

[54] BISTABLE DMD ADDRESSING CIRCUIT AND METHOD

[75] Inventor: Larry J. Hornbeck, Van Alstyne, Tex.

[73] Assignee: Texas Instruments Incorporated, Dallas, Tex.

[21] Appl. No.: 546,271

[22] Filed: Jun. 29, 1990

[51] Int. Cl.[5] .................. G02F 1/29; G02B 26/08; H01J 31/24
[52] U.S. Cl. .................. 359/226; 359/198; 359/212
[58] Field of Search ............... 359/197, 198, 201, 212, 359/236, 226, 271, 298; 358/231; 353/122

[56] References Cited

U.S. PATENT DOCUMENTS

| | | | |
|---|---|---|---|
| 3,600,798 | 8/1971 | Lee | 29/592 |
| 3,746,911 | 7/1973 | Nathanson et al. | 315/21 R |
| 3,886,310 | 5/1975 | Guldberg et al. | 350/161 |
| 4,178,077 | 12/1979 | Velde | 350/285 |
| 4,317,611 | 3/1982 | Peterson | 350/486 |
| 4,519,676 | 5/1985 | Velde | 350/269 |
| 4,566,935 | 1/1986 | Hornbeck . | |
| 4,592,628 | 6/1986 | Altman et al. | 350/486 |
| 4,615,595 | 10/1986 | Hornbeck . | |
| 4,662,746 | 5/1987 | Hornbeck . | |
| 4,710,732 | 12/1987 | Hornbeck | 332/7.51 |
| 4,712,888 | 12/1987 | Brooks | 350/486 |
| 4,723,834 | 2/1988 | Venne et al. | 350/269 |
| 4,729,636 | 3/1988 | Velde | 350/269 |
| 4,793,699 | 12/1988 | Tokuhara | 350/487 |

FOREIGN PATENT DOCUMENTS 0332953 9/1989 European Pat. Off. .

*Primary Examiner*—Nelson Moskowitz
*Attorney, Agent, or Firm*—Julie L. Schneider; James C. Kesterson; Richard L. Donaldson

[57] ABSTRACT

Bidirectional operation of the bistable DMD is preferred over unidirectional operation because it eliminates contrast degradation caused by duty-factor effects and permits lower voltage operation. However, bidirectional addressing requires either two drain lines and two transistors per pixel or one drain line and three transistors per pixel. An addressing scheme for bidirectional operation is disclosed that requires only a single drain line and one transistor per pixel. For megapixel DMDs used for high-definition television applications, this addressing scheme dramatically lowers the transistor count, with expected improvements in chip yield and cost.

18 Claims, 5 Drawing Sheets

BISTABLE DMD ADDRESSING CIRCUIT AND METHOD

TECHNICAL FIELD OF THE INVENTION

This invention relates to deformable mirror devices (DMD's) and more particularly to an addressing arrangement for such devices.

RELATED APPLICATIONS

All of the following patent applications are cross-referenced to one another an all have been assigned to Texas Instruments Incorporated. These applications have been concurrently filed and are hereby listed as related applications.

| U.S. Pat. No. | | |
|---|---|---|
| 546,465 | 6/29/90 | Multi-Level Deformable Mirror Device |
| 5,018,256 | | Improved Architecture and Process for Integrating DMD with Control Circuit Substrates |
| 546,332 | 6/29/90 | Field Updated Deformable Mirror Device |
| | | Also referenced herein is: |
| 5,061,049 | | Spatial Light Modulator and Method, Serial #355,049, filed May 15, 1989; |
| 618,013 | 11/26/90 | Spatial Light Modulator and Method, Serial #408,355, filed September 14, 1989; |
| 4,662,746 | | Spatial Light Modulator and Method Dated May 5, 1987; |
| 4,566,935 | | Spatial Light Modulator and Method Dated January 28, 1986; and |
| 4,615,595 | | Frame Addressed Spatial Light Modulator Dated October 7, 1986 |

BACKGROUND OF THE INVENTION

Certain video applications, such as high-definition television (HDTV) require pixelated displays having array sizes as large as 1050×1700 or 1.8 megapixels. A bistable deformable mirror device (DMD) disclosed in the above-listed U.S. Pat. No. 5,061,049 entitled SPATIAL LIGHT MODULATOR AND METHOD, can be used as a projection light valve for such applications. For DMDs as large as 1.8 megapixels, it is extremely important to minimize the number of transistors per pixel in order to maximize chip yield and lower the cost.

The number of transistors required per pixel depends on whether the bistable DMD is operated unidirectional or bidirectional. In unidirectional operation, the torsion beam (reflective surface) is operated between its quiescent or flat state and a positive landing angle. The projection optics is designed so that the quiescent state is the dark state and the positive landing angle is the bright state.

The address sequence begins with bias being momentarily returned to ground, and the reflective beams reset with a reset pulse. The positive address electrode voltage, $\theta_a$, is then set to either $\theta_a = +|V|$ or $\theta_a = 0$ by the address transistor, where $V_a$ is the value of the voltage placed on the address electrode and then the bias is turned back on. For $+|V_a|$ on the address electrode, the beam rotates to $\theta = +\theta_L$. For 0V on where $\theta$ is the rotation angle of the beam, and $\theta_L$ is the angle of the beam when it lands the address electrode, the beam remains at $\theta = 0$.

In bidirectional operation, the torsion beam is operated between two landing states. The projection optics are designed so that one state is the dark state and the other state is the bright state.

Because the address circuit is more complex for bidirectional operation, requiring additional transistors, it would seem that unidirectional operation would be preferred. However, there are two limitations to unidirectional operation. First, a higher address voltage is required. Second, duty factor effects can lead to contrast degradation. These limitations are discussed in more detail in what follows.

In order to lower the address voltage requirement, a bias is applied to the beam. The amount of bias determines whether the beam is monostable, tristable, or bistable. For unidirectional operation, a potential energy barrier must be maintained between the flat state and the landed states. This barrier insures that the beam will remain in the flat state (for 0V address) and not spontaneously deflect to either one of the landed states with application of the bias. Therefore, for unidirectional operation, the bias is limited to a level which insures a potential energy barrier adequate to prevent spontaneous deflection. This limitation on bias forces the address voltage to be increased. For example, a typical bistable DMD operated with no bias requires a 16 volt address. At a bias of $-10V$ the DMD is operating in the tristable mode and requires a $+10V$ address. At a bias of $-16V$ the DMD is operating in the bistable mode and requires only a $+5V$ address. It is clear in this example, that to be compatible with standard 5V CMOS address circuitry, it is necessary to operate in the bistable mode, which requires bidirectional operation and addressing.

Duty factor effects are a second limitation to unidirectional operation. When a torsion hinge is twisted, a portion of its surface is in compression and a portion in tension. Surface residues on the torsion hinges are subjected to these stresses. Over a sufficient period of time, these residues can stress relieve while in the twisted state. When the torsion hinge is then returned to its quiescent (untwisted) state, these residues provide a built-in stress that tends to keep the hinge twisted, and the beam is no longer flat in its quiescent state. The greater the deflection duty factor (i.e., the fractional length of time that the torsion hinge is in its twisted state) and the longer the time of operation, the greater the beam deflection angle when it is returned to its quiescent state.

This quiescent deflection is amplified by the differential bias and can amount to two to three degrees for a ten degree landing angle. Unless sufficient optical deadband is designed into the darkfield projection optics, this quiescent deflection can degrade the optical contrast.

This duty-factor stress relief mechanism is not avoided by going to bidirectional operation, but in that mode of operation, no contrast degradation is observed because the beam is operating between the two landing angles ($\theta = \pm \theta_L$) and not between the quiescent state ($\theta = 0$) and the positive landing angle ($\theta = +\theta_L$). Although the duty-factor effect has no influence on the contrast for the bidirectional mode of operation, the address voltage is influenced. A greater address voltage must be applied in one direction to compensate for the quiescent offset angle caused by stress relief. When a bidirectional DMD is quoted as operating at an address voltage of five volts, that five volts must include enough operating margin to allow for duty-factor offset.

Accordingly, a need exists in the art for a bistable deflection device which operates in the bidirectional mode in order to avoid the limitations of unidirectional operation, while at the same avoiding the more complex address circuit requirements of bidirectional operation.

SUMMARY OF THE INVENTION

As has been discussed, the simplest addressing is achieved with unidirectional operation, but bidirectional operation avoids the contrast degradation caused by duty-factor effects and permits lower voltage operation. In order to retain the benefits of bidirectional operation without paying the penalty of increased address circuit complexity, a new address circuit has been constructed called the driven beam approach. The address signal ($\phi_a$) is placed on the beam rather than on the electrodes and is provided by a single address transistor. The differential bias [$\phi_b(+)$, $\phi_b(-)$] is applied to the electrodes in the form of an offset bipolar bias. Landing electrodes are replaced by oxide landing pads on top of the bias electrodes.

In one embodiment, the address voltage which is applied to the beam is 0V or +5V and the required differential bias to achieve bistability is 15V. The negative bias electrode is then biased at −15V and the positive bias electrode is set at +20V.

When the beam is addressed to 0V, there is a +15 volt potential difference between the beam and negative bias electrode and a −20 volt difference between the beam and positive bias electrode. The torque produced by the bias electrodes depends only on the absolute value of the potential difference. Because of the five volt larger potential difference between the beam and the positive bias electrode, the beam rotates to the positive landing angle.

When the beam is addressed to +5V, there is a +20 volt potential difference between the beam and negative bias electrode and a −15 volt difference between the beam and positive bias electrode. As a result, the beam rotates to the negative landing angle.

An oxide pad is placed at the tip of the bias electrode to prevent electrical discharge between the beam and electrode when the beam lands.

Accordingly, it is a technical advantage of the biased beam spatial bistable device that it will rotate between two positions with a single transistor driving circuit and will do so using CMOS operating voltage levels.

It is another technical advantage of such a device that the contrast between optical states is constant without regard to duty cycle while maintaining a constantly lower voltage operation.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
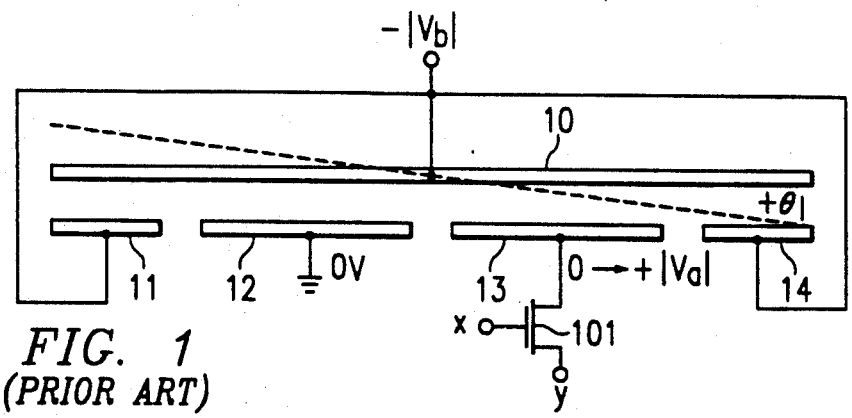
FIG. 1 shows typical unidirectional operation of a DMD.

In DMD arrays, the number of transistors required per pixel depends on whether the bistable DMD is operated in the unidirectional mode or in the bidirectional mode. In unidirectional operation, as shown in FIG. 1, torsion beam 10 is operated between its quiescent or flat state ($\theta=0$) and the positive landing angle ($\theta=+\theta_L$). The projection optics are designed so that the quiescent state is the dark state and the positive landing angle is the bright state. Positive address electrode 13 is connected to address transistor 101. Negative address electrode 12 is grounded. Beam 10 and landing electrodes 11 and 14 are each connected to a negative bias, $-|V_b|$. The bias level is adjusted to operate the beam in a monostable or tristable mode. A lower address voltage is achieved with the tristable mode compared with the monostable mode because of the larger bias.

The address sequence begins with the bias being momentarily returned to ground, and the beams reset with a reset pulse. The positive address electrode voltage is then set to either $\phi_a=+|V_a|$ or $\phi_a=0$ by address transistor 101, and then the bias is turned back on. For $+|V_a|$ on address electrode 13, beam 10 rotates to $\theta=+\theta_L$. For 0V on the address electrode 13, beam 10 remains at $\theta=0$.

Figure 2:
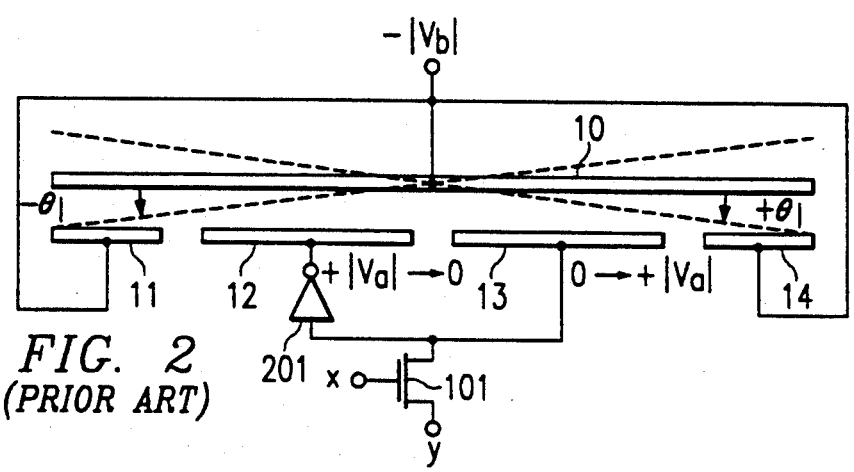
FIGS. 2 and 3 show typical bidirectional operation of a DMD.
Figure 3:
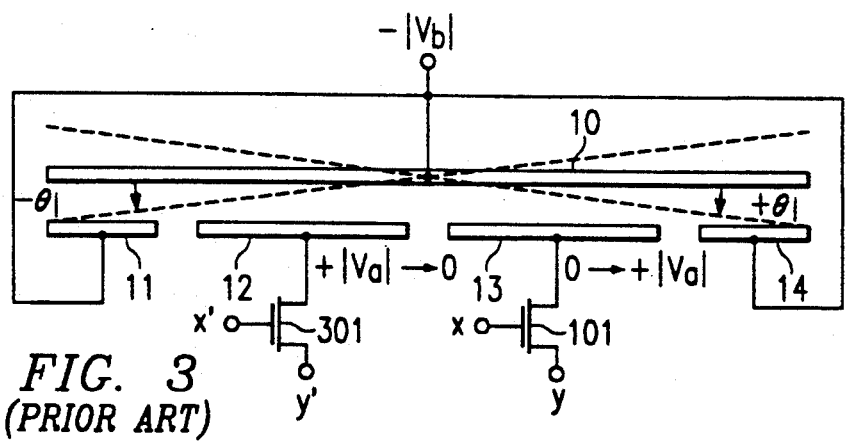

In bidirectional operation as shown in FIGS. 2 and 3, torsion beam 10 is operated between $\theta=-\theta_L$ and $\theta=+\theta_L$. The projection optics are designed so that $\theta=-\theta_L$ is the dark state and $\theta=+\theta_L$ is the bright state. Address electrodes 12 and 13 are connected to complementary signals using the circuits shown in FIG. 2 or FIG. 3.

The circuit of FIG. 2 generates the complementary signals with one inverter 201 and one address transistor 101 (three transistors and one drain line per pixel).

The circuit of FIG. 3 uses two address transistors 101 and 301 (two transistors and two drain lines per pixel). The bias level is adjusted to operate in the bistable mode. The lowest address voltage is achieved with this mode of operation. The address sequence is similar to the unidirectional case.

As discussed above, since the address circuit is more complex for bidirectional operation, it would seem that unidirectional operation would be preferred. However, there are two limitations to unidirectional operation. First, a higher address voltage is required. Second, duty factor effects can lead to contrast degradation. These limitations are discussed in more detail in what follows.

Figure 4:
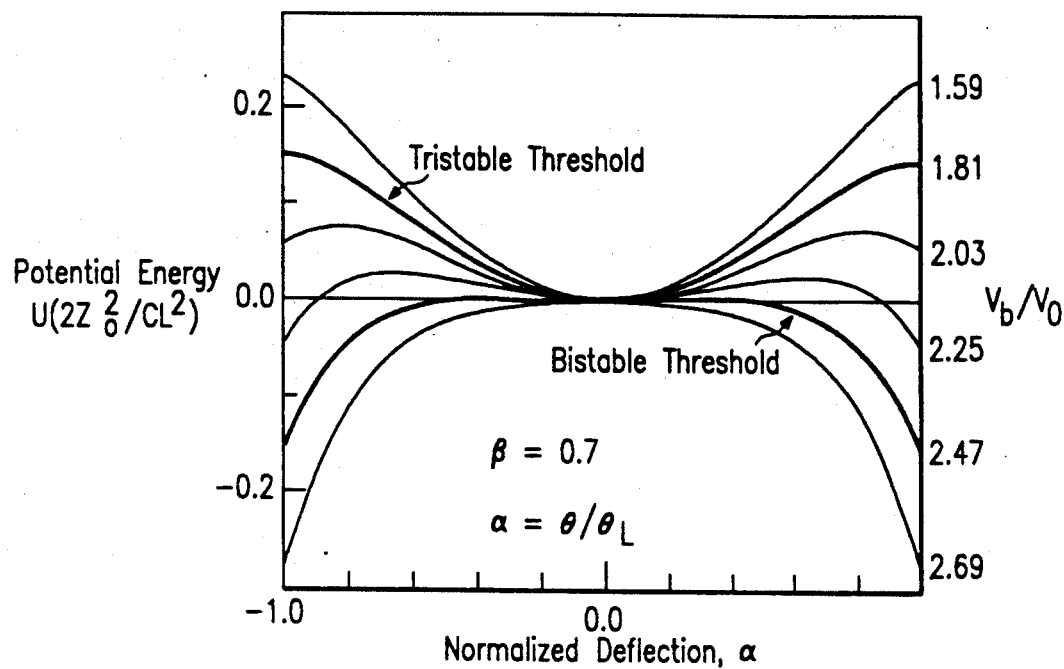
FIG. 4 shows an energy diagram of DMD thresholds.

In order to lower the address voltage requirement, a bias is applied to the beam. As shown in FIG. 4, the amount of bias determines whether the beam is monostable, tristable, or bistable. For unidirectional operation, a potential energy barrier must be maintained between the flat state ($\theta=0$) and the landed states ($\theta=\pm\theta_L$). This barrier insures that the beam will remain in the flat state (for 0V address) and not spontaneously deflect to either one of the landed states with application of the bias. Therefore, for unidirectional operation, the bias is limited to a level which insures a potential energy barrier adequate to prevent spontaneous deflection. This limitation on bias forces the address voltage to be increased. For example, a typical bistable DMD operated with no bias requires a 16 volt address. At a bias of −10V the DMD is operating in the tristable mode and requires a +10V address. At a bias of −16V the DMD is operating in the bistable mode and requires only a +5V address. It is clear in this example, that to be compatible with standard 5V CMOS address circuitry, it is necessary to operate in the bistable mode, which requires bidirectional operation and addressing.

Duty factor effects are a second limitation to unidirectional operation. When a torsion hinge is twisted, a portion of its surface is in compression and a portion in tension. Surface residues on the torsion hinges are subjected to these stresses. Over a sufficient period of time, these residues can stress relieve while in the twisted state. When the torsion hinge is then returned to its quiescent (untwisted) state, these residues provide a built-in stress that tends to keep the hinge twisted, and the beam is no longer flat in its quiescent state. The greater the deflection duty factor (i.e., the fractional length of time that the torsion hinge is in its twisted state) and the longer the time of operation, the greater the beam deflection angle when it is returned to its quiescent state.

This quiescent deflection is amplified by the differential bias and can amount to two to three degrees for a ten degree landing angle. Unless sufficient optical deadband is designed into the darkfield projection optics, this quiescent deflection can degrade the optical contrast.

This duty-factor stress relief mechanism is not avoided by going to bidirectional operation, but in that mode of operation, no contrast degradation is observed because the beam is operating between the two landing angles ($\theta = \pm \theta_L$) and not between the quiescent state ($\theta = 0$) and the positive landing angle ($\theta = +\theta_L$). Although the duty-factor effect has no influence on the contrast for the bidirectional mode of operation, the address voltage is influenced. A greater address voltage must be applied in one direction to compensate for the stress relief offset to the quiescent angle. When a bidirectional DMD is quoted as operating at an address voltage of five volts, that five volts must include enough operating margin to allow for duty-factor offset.

As has been discussed, the simplest addressing is achieved with unidirectional operation, but that bidirectional operation avoids the contrast degradation caused by duty-factor effects and permits lower voltage operation. In order to retain the benefits of bidirectional operation without paying the penalty of increased address circuit complexity, the following address circuit is proposed.

Figure 5:
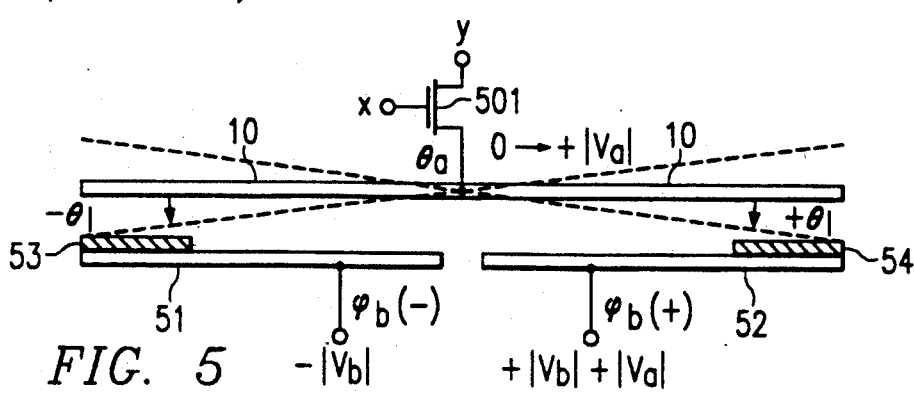
FIG. 5 shows the driven beam addressing technique of this invention.

The circuit shown in FIG. 5 is called the driven beam approach. The address signal ($\phi_a$) is placed on beam 10 rather than on the electrodes and is provided by a single address transistor 501. The differential bias [$\phi_b(+)$, $\phi_b(-)$] is applied to electrodes 51 and 52 in the form of an offset bipolar bias. Landing electrodes 11 and 14 are replaced by oxide landing pads 53 and 54 on top of the bias electrodes.

In order to illustrate the operation of the address circuit of FIG. 5, it is assumed that the address voltage applied to beam 10 is 0V or +5V and the required differential bias to achieve bistability is 15V. Negative bias electrode 51 is then biased at −15V and positive bias electrode 52 is set at +20V.

When beam 10 is addressed to 0V, there is a +15 volt potential difference between beam 10 and negative bias electrode 51 and a −20 volt difference between beam 10 and positive bias electrode 52. The torque produced by the bias electrodes depends only on the absolute value of the potential difference. Because of the five volt larger potential difference between beam 10 and positive bias electrode 52, beam 10 rotates to the positive landing angle.

When beam 10 is addressed to +5V, there is a +20 volt potential difference between beam 10 and negative bias electrode 51 and a −15 volt difference between beam 10 and positive bias electrode 52. As a result, beam 10 rotates to the negative landing angle.

Oxide pads 53 and 54 are placed at the tips of bias electrodes 51 and 52 to prevent electrical discharge between beam 10 and the electrode when the beam lands. Conventional landing electrodes can also be employed. However, the landing electrodes cannot be connected in common, as they are in the prior art. For this proposed driven beam address scheme the beams are electrically isolated and the landing electrodes between neighboring pixels must also be electrically isolated and connected to their respective beams. This bussing complication between the beams and their respective landing electrodes makes an oxide landing pad a more attractive approach.

Resonant reset is accomplished in the usual fashion except the reset pulses are applied to the two bias electrodes 51 and 52.

Figure 6:
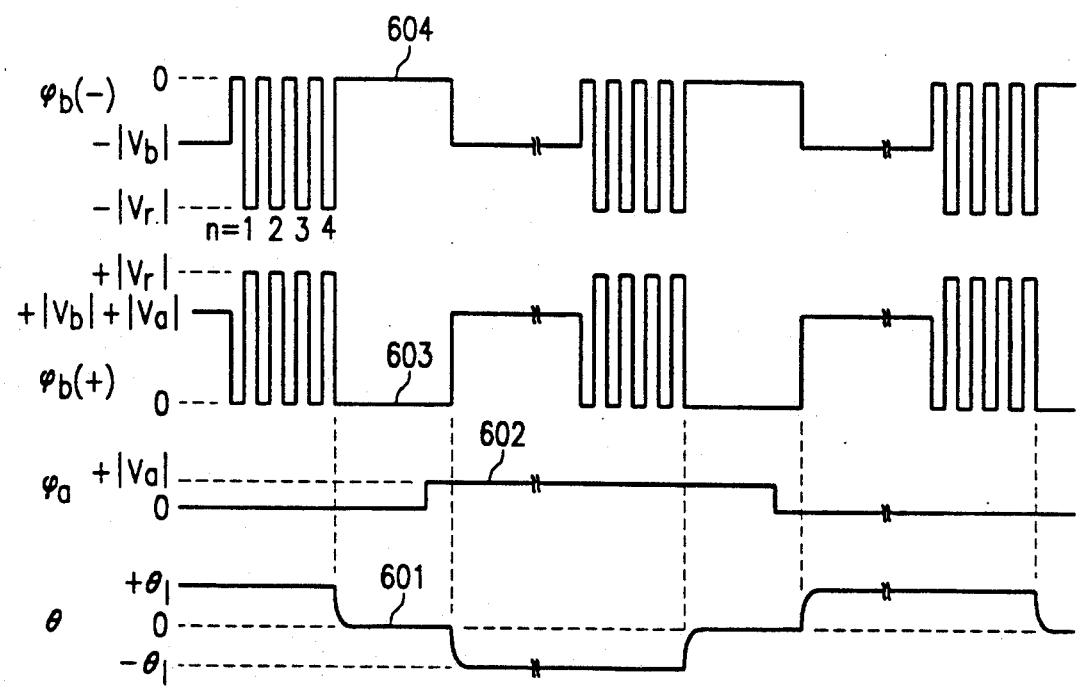
FIG. 6 shows the beam and electrode waveforms of a typical system.

The timing diagram shown in FIG. 6 illustrates the beam and electrode waveforms including the resonant reset pulses.

In the prior art bistable DMD, the beams are in common and can share support posts as shown in above-listed copending application entitled MULTI-LEVEL DEFORMABLE MIRROR DEVICE. In the driven beam bistable DMD there must be two support posts per pixel, one of which is connected to an address transistor, or alternately, shared support posts where one of the two torsion rods connected to that post is electrically isolated from that post. The first approach (two support posts per pixel) as shown in FIGS. 7 and 8 is preferred because it can automatically be accommodated with only one extra mask level and with no loss of area efficiency, using the hidden hinge architecture of the Multi-Level Deformable Mirror Device application.

Figure 7:
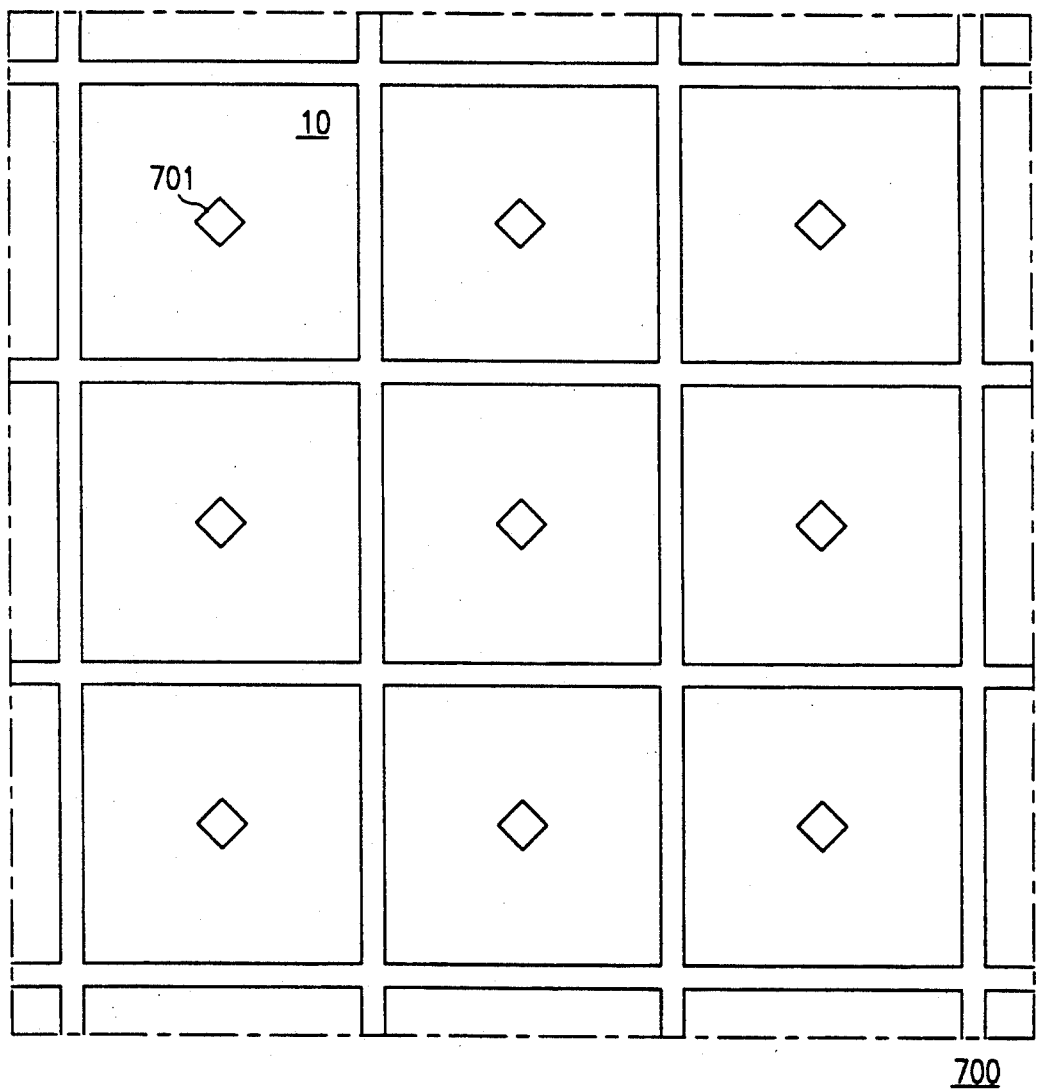
FIGS. 7 and 8 show a plan view of a bistable DMD pixel.

FIG. 7 shows an array 700 of pixel beams 10 with center beam support posts 701. Beams 10 are selectively deflected by the address scheme previously discussed.

Figure 8:
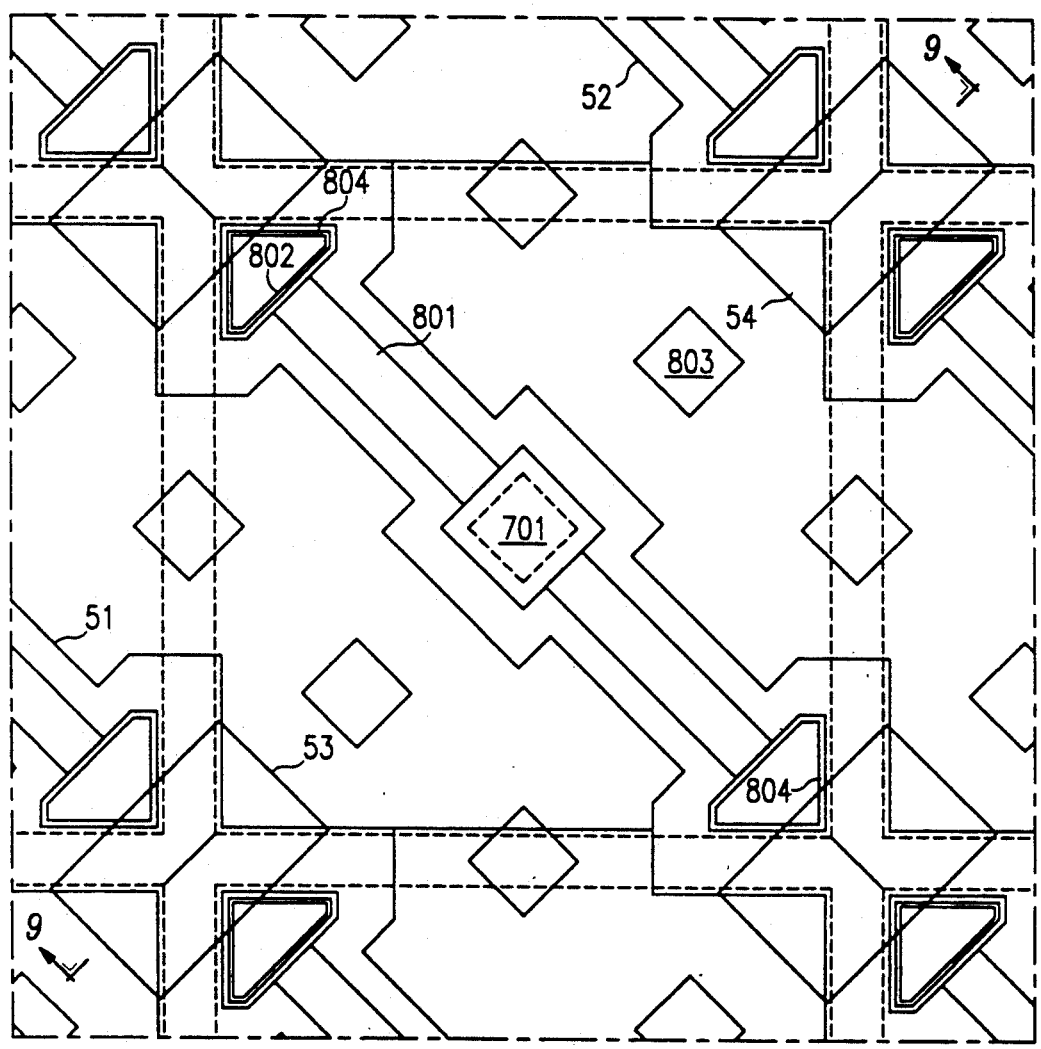

FIG. 8 shows the underlying bias electrodes 51 and 52 and hinge 801 supported by support post 804 on both ends. On one end of hinge 801 support post 804 is constructed so that contact could be made with the underlying address control circuitry through contact 802. The bias electrodes are supported by support posts 803.

Figure 9:
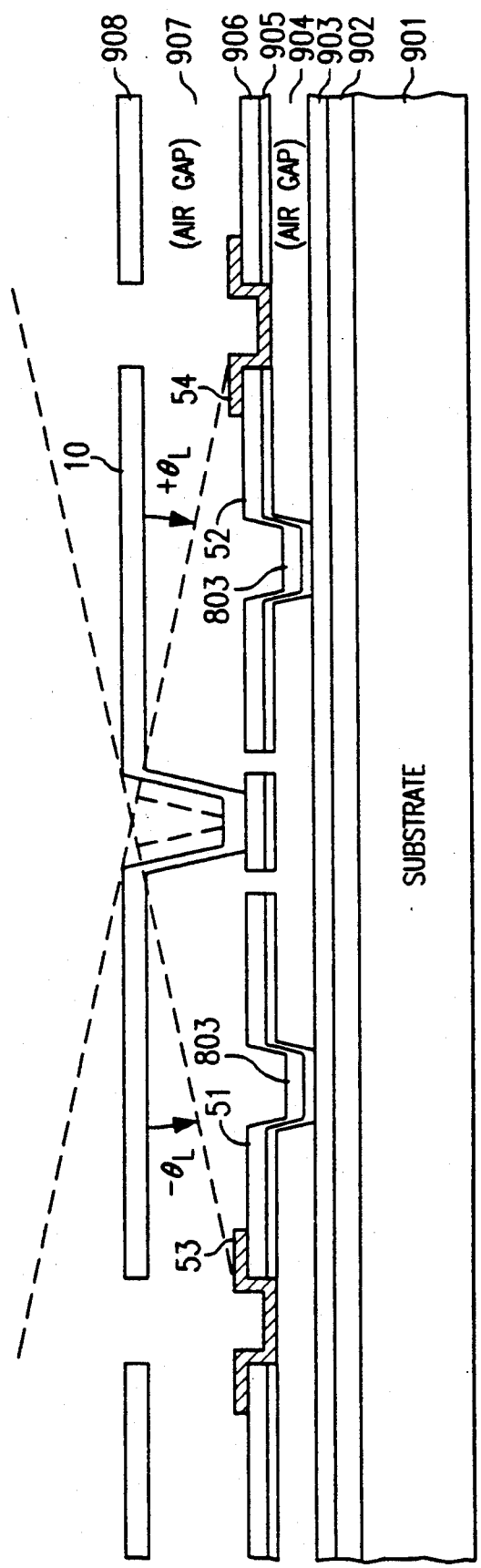
FIG. 9 shows a cross section view of a DMD pixel, taken a long Section 9—9 of FIG. 8.

FIG. 9 shows a cross section taken through section 99 of FIG. 8 showing beam 10 deflectable to either oxide pad 53 or to oxide pad 54 under control of the combination of an address signal applied to beam 10 and bias potential on electrodes 51 and 52 as previously discussed.

Layer 901 is a substrate including address circuitry, and this can be CMOS technology. Layer 902 is the final metalization layer of the address circuit. Layer 903 is the protection oxide of the substrate. Layer 904 in the final stage is an air gap constructed by removing a first spacer. Layer 905 is the hinge metal. Layer 906 is the bias electrode metal. Layer 907 is another air gap formed by removing a second spacer, and layer 908 is the beam metal.

Bias electrodes 51 and 52 are most conveniently interconnected by using the electrode metal (FIG. 8) rather than the underlying final metalization layer of the underlying address circuit. However, with this approach the positive bias electrode of one pixel becomes the negative bias electrode of the next pixel. To correct for the pixel-to-pixel polarity inversion of the bias electrodes, the video input is complemented every other pixel.

Although this description describes the invention with reference to the above specified embodiments, the claims and not this description limits the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A spatial light modulation device, said device comprising:
   a multilayered substrate, wherein an upper layer of said substrate contains a defined rotatable beam area;
   a first bias electrode positioned in proximity to said rotatable beam and operative for establishing voltage potential thereon; and
   circuitry for selectively establishing an address voltage potential on said beam, said voltage potential operative in conjunction with said voltage potential on said bias electrode for selectively enabling said beam to rotate, wherein said circuitry is in contact with at least one area of said beam.

2. The device set forth in claim 1 wherein said address voltage is one of two voltages, said device further comprising:
   a second bias electrode positioned in proximity to said rotatable beam and operative for establishing a voltage potential thereon different from the voltage potential established on said first bias electrode so that one or the other of said address voltages on said beam operating in conjunction with said bias voltages controls the direction of said rotation.

3. The device set forth in claim 2 wherein said bias electrode and said second bias electrode are spaced apart and on opposite sides of a pivotal point of said beam, such that a first voltage on said beam causes said beam to rotate around said pivotal point toward said first bias electrode, and said second voltage on said rotatable beam causes said beam to pivot toward said second bias electrode.

4. The device set forth in claim 3 further including
   a pair of electrically insulating landing pads for supporting said beam when said beam is pivoted in conjunction with said bias electrode or in conjunction with said second bias electrode.

5. The device set forth in claim 2 further comprising a base layer;
   a layer separate from said base layer defining said controllably rotatable beam area; and
   a hinge supported by said base layer and connected to said rotatable area for supporting said rotatable area and for allowing said rotatable area to move within a defined motion with respect to said base layer, said hinge laying in a plane separate from the plane of said rotatable layer.

6. The device set forth in claim 5 wherein said base layer includes control circuitry defined therein, and wherein said device further includes:
   a layer interposed between said base layer and said layer separate from said base layer, said interposed layer having defined therein discrete areas for providing signals for controlling said rotation of said rotatable area; and
   interconnection structure for communicating signals from said control circuitry to said discrete thereby controlling said rotatable area.

7. The device set forth in claim 6 wherein said control circuitry is constructed using CMOS technology.

8. The device set forth in claim 2 wherein said two address voltages are 0 and $+V_a$ and wherein said first and second bias voltages are $-|V_b|$ and $+|V_b|+|V_a|$, respectively.

9. The device set forth in claim 8 wherein $V_a=5$ volts and $V_b=15$ volts.

10. An array of spatial with modulation devices, said array comprising:
    a multilayered substrate, wherein an upper layer of said substrate contains a plurality of defined controllably rotatable beam areas;
    bias electrodes positioned in proximity to said rotatable beams and operative for establishing different voltage on each said bias electrode; and
    circuitry for selectively establishing a voltage potential on said beams, said voltage potential operative in conjunction with said voltage potentials on said bias electrodes for selectively enabling said beams to rotate, wherein said circuitry is in contact with at least one area of each of said beams.

11. The array set forth in claim 10 wherein said beam voltage is one of two voltages so that said beam voltages operate in conjunction with said bias voltages to control the direction of said rotation of said beam.

12. The array set forth in claim 11 wherein said bias electrodes for each said beam are spaced apart and on opposite sides of a pivotal point of said beam, such that a first voltage on said beam causes said beam to rotate around said pivotal point toward said one bias electrode, and said second voltage on said rotatable beam causes said beam to pivot toward said second bias electrode.

13. The array set forth in claim 10 further comprising a HDTV system and wherein said array is the visual display in said system.

14. The array set forth in claim 12 wherein all said bias electrodes on one side of said pivotal points are electrically common on all bias electrodes on the other side of said pivotal points are electrically common.

15. The method of establishing a spatial light modulation device having a defined controllably rotatable beam area, said method comprising the steps of:
    positioning a first bias electrode in proximity to said rotatable beam;
    establishing a voltage potential on said bias electrode;
    selectively establishing an address voltage potential on said beam, said voltage potential operative in conjunction with said established voltage potential on said bias electrode for rotating said beam, wherein said address voltage potential is established by addressing circuitry which is in contact with said beam.

16. The method set forth in claim 15 wherein said address voltage establishing step includes the step of providing one of two voltages.

17. The method set forth in claim 16 further comprising the steps of:
positioning a second bias electrode in proximity to said rotatable beam;
establishing a voltage potential on said second bias electrode different from the voltage potential established in said first bias electrode so that one or the other of said address voltages on said beam operating in conjunction with said bias voltages controls the direction of said rotation.

18. The method set forth in claim 17 wherein said bias electrode positioning steps include the step of
spacing said electrodes apart and on opposite sides of a pivotal point of said beam, such that said first voltage on said beam causes said beam to rotate around said pivotal point toward said first bias electrode, and said second voltage on said rotatable beam causes said beam to pivot toward said second bias electrode.

* * * * *